(12) United States Patent
Liu et al.

(10) Patent No.: US 7,948,699 B2
(45) Date of Patent: May 24, 2011

(54) SYSTEMS AND METHODS FOR EQUALIZER OPTIMIZATION IN A STORAGE ACCESS RETRY

(75) Inventors: Jingfeng Liu, Longmont, CO (US); Hongwei Song, Longmont, CO (US); Richard Rauschmayer, Longmont, CO (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 185 days.

(21) Appl. No.: 12/348,236

(22) Filed: Jan. 2, 2009

(65) Prior Publication Data

US 2010/0172046 A1    Jul. 8, 2010

(51) Int. Cl.
G11B 5/09    (2006.01)
(52) U.S. Cl. .................. 360/39; 360/46; 360/53
(58) Field of Classification Search .................. None
See application file for complete search history.

(56) References Cited

U.S. PATENT DOCUMENTS

| | | |
|---|---|---|
| 5,262,904 A | 11/1993 | Tang et al. |
| 5,357,520 A | 10/1994 | Arnett et al. |
| 5,493,454 A | 2/1996 | Ziperovich et al. |
| 5,517,146 A | 5/1996 | Yamasaki |
| 5,583,705 A | 12/1996 | Ziperovich et al. |
| 5,781,358 A | 7/1998 | Hasegawa |
| 5,986,830 A | 11/1999 | Hein |
| 5,999,355 A | 12/1999 | Behrens et al. |
| 6,043,942 A | 3/2000 | Cunningham et al. |
| 6,091,560 A | 7/2000 | Du |
| 6,130,794 A * | 10/2000 | Christensen .................. 360/53 |
| 6,134,691 A | 10/2000 | Hirasaka |
| 6,141,168 A | 10/2000 | Takahashi et al. |
| 6,147,828 A | 11/2000 | Bloodworth et al. |
| 6,181,505 B1 | 1/2001 | Sacks et al. |
| 6,208,481 B1 | 3/2001 | Spurbeck et al. |
| 6,212,024 B1 | 4/2001 | Igarashi et al. |
| 6,243,031 B1 | 6/2001 | Jusuf et al. |
| 6,246,723 B1 | 6/2001 | Bliss et al. |

(Continued)

FOREIGN PATENT DOCUMENTS

GB    2 320 866    6/1997

OTHER PUBLICATIONS

U.S. Appl. No. 12/199,325, filed Aug. 27, 2008, Mathew.

(Continued)

*Primary Examiner* — Jason C Olson
(74) *Attorney, Agent, or Firm* — Hamilton, DeSanctis & Cha

(57) ABSTRACT

Various embodiments of the present invention provide data processing circuits that include a multiplexer, a memory buffer, a data processing circuit, and a channel setting modification circuit. A first input of the multiplexer receives an input data set and a second input of the multiplexer receives a buffered data set. The multiplexer provides either the input data set or the buffered data set as a multiplexer output based upon a select signal. The memory buffer receives the multiplexer output and provides the buffered data set. Operation of the data processing circuit is at least in part governed by channel settings. The data processing circuit receives the multiplexer output and performs a data detection process. The select signal is asserted to select the buffered data set when the data detection process fails, and is asserted to select the input data set when the data detection process succeeds. The channel setting modification circuit is operable to modify the channel settings when the data detection process fails.

26 Claims, 5 Drawing Sheets

U.S. PATENT DOCUMENTS

| | | | |
|---|---|---|---|
| 6,337,778 | B1 | 1/2002 | Gagne |
| 6,396,651 | B1 | 5/2002 | Grover |
| 6,404,572 | B1 | 6/2002 | Hong |
| 6,535,345 | B1 | 3/2003 | Shimoba |
| 6,563,655 | B1 | 5/2003 | Yamasaki et al. |
| 6,621,648 | B2 | 9/2003 | Elliott et al. |
| 6,662,303 | B1 | 12/2003 | Toosky et al. |
| 6,671,244 | B2 | 12/2003 | Honma |
| 6,674,590 | B2 | 1/2004 | Ottesen et al. |
| 6,678,230 | B2 | 1/2004 | Mayashita et al. |
| 6,721,114 | B1 | 4/2004 | Sutardja et al. |
| 6,788,481 | B2 | 9/2004 | Fang et al. |
| 6,894,854 | B1 | 5/2005 | Carlson et al. |
| 6,912,682 | B1 * | 6/2005 | Aoki ............................ 714/764 |
| 6,934,100 | B2 | 8/2005 | Ueno |
| 6,937,415 | B2 * | 8/2005 | Galbraith et al. ............... 360/53 |
| 7,012,772 | B1 | 3/2006 | Vis |
| 7,079,342 | B1 | 7/2006 | Han et al. |
| 7,092,179 | B2 | 8/2006 | Yamanouchi |
| 7,123,429 | B2 | 10/2006 | Musungu et al. |
| 7,126,773 | B1 | 10/2006 | Taratorin |
| 7,193,802 | B2 | 3/2007 | Cideciyan et al. |
| 7,248,424 | B2 | 7/2007 | Ueno |
| 7,256,954 | B2 | 8/2007 | Serizawa et al. |
| 7,262,928 | B1 | 8/2007 | Oberg |
| 7,271,753 | B1 | 9/2007 | Padukone et al. |
| 7,308,057 | B1 | 12/2007 | Patapoutian |
| 7,440,224 | B2 | 10/2008 | Ehrlich et al. |
| 7,495,854 | B2 | 2/2009 | Hutchins |
| 7,542,227 | B2 | 6/2009 | Che et al. |
| 7,715,135 | B1 | 5/2010 | Sutardja et al. |
| 7,733,591 | B2 * | 6/2010 | Bottemiller et al. ............ 360/51 |
| 2002/0159350 | A1 | 10/2002 | Ogura |
| 2003/0048564 | A1 | 3/2003 | Koller et al. |
| 2005/0117243 | A1 | 6/2005 | Serizawa et al. |
| 2006/0061496 | A1 * | 3/2006 | Stein et al. |
| 2006/0062125 | A1 * | 3/2006 | Horie et al. |
| 2006/0176947 | A1 * | 8/2006 | Hyun-Wook |
| 2007/0041115 | A1 * | 2/2007 | Lee |
| 2007/0047120 | A1 * | 3/2007 | DeGroat |
| 2007/0076313 | A1 * | 4/2007 | Hutchins et al. |
| 2007/0140088 | A1 * | 6/2007 | Hino et al. |
| 2008/0031114 | A1 * | 2/2008 | Hong et al. |
| 2008/0037153 | A1 * | 2/2008 | Yoshizawa |
| 2008/0081382 | A1 * | 10/2008 | Mathew |
| 2009/0161245 | A1 * | 6/2009 | Mathew |

OTHER PUBLICATIONS

U.S. Appl. No. 12/273,265, filed Nov. 18, 2008, Mathew.
U.S. Appl. No. 12/247,378, filed Oct. 8, 2008, Mathew.
U.S. Appl. No. 12/337,775, filed Dec. 18, 2008, Mathew.
U.S. Appl. No. 12/337,805, filed Dec. 18, 2008, Mueller.
U.S. Appl. No. 12/337,828, filed Dec. 18, 2008, Mueller.
U.S. Appl. No. 12/337,850, filed Dec. 18, 2008, Mueller.
Cho and Lee, "An Estimation Technique for Nonlinear Distortion in High Density Magnetic Recording Channels", IEEE Transactions on Magnetics, vol. 34, No. 1, pp. 40-44 Jan 1998.
Degroat et al., "Experimental Characterization of Media Noise Based on Equalized Synchronized Drive Data", IEEE Trans. Magnetics, vol. 37, No. 2, pp. 633-638, Mar. 2001.
Farhang-Boroujeny, Adaptive Filters: Theory and Applications. John Wiley & Sons Ltd, 1998, Chapter 11. pp. 373-379.
Kavcic and Patapoutian, "A Signal-Dependent Autoregressive Channel Model", IEEE Trans. Magnetics, vol. 35 No. 5, pp. 2316-2318, Sep. 1999.
Lin et al. "An estimation technique for accurately modelling the magnetic recording channel including nonlinearities." IEEE Trans. Mag, vol. 25, No. 5, pp. 4084-4086, Sep. 1989.
Moon, J., "Signal-to-Noise Ratio Definition for Magnetic Recording Channels With Transition Noise", IEEE Trans. Magnetics, vol. 36, No. 5, pp. 3881-3883, Sep. 2000.
Palmer et al, "Identification of nonlinear write effects using pseudo-random sequences" IEEE Trans. Magnetics, vol. 23 No. 5, pp. 2377-2379, Sep. 1987.
Partovi; et al., "Flow-Through Latch and Edge-Triggered Flip-Flop Hybrid Elements"; Feb. 8, 1996; pp. 138-139; Solid-State Circuits Conf Digest of Technical Papers IEEE.
Tokumasu et al. "A New Reduced Clock-Swing Flip-Flop (NDKFF)," Corporate Research & Development Center, Toshiba Corporation. IEEE Feb. 2002 Custom Intergrated Circuits Conf.
Wood and Donaldson, "The Helical-Scan Magnetic Tape Recorder as a Digital Communication Channel", IEEE Transactions on Magnetics, vol. MAG-15, No. 2, pp. 935-943 Mar. 1979.

* cited by examiner

SYSTEMS AND METHODS FOR EQUALIZER OPTIMIZATION IN A STORAGE ACCESS RETRY

BACKGROUND OF THE INVENTION

The present inventions are related to systems and methods for accessing data from a storage medium, and more particularly to systems and methods for retrying a previously failed data access from a storage medium.

A typical storage device includes a magnetic storage medium that includes information that is magnetically represented on the storage medium. A head is disposed in relation to the storage medium that senses the magnetically represented information and provides an electrical signal representing the information. This electrical signal is ultimately passed to a data detection circuit that performs one or more data detection processes in order to recover the information originally written to the storage medium. In some cases, the data processes fail to converge on the originally written information due to an error on either the storage medium or in the interface between the head and the storage medium. In such a case, an attempt to retry a read of the affected area is triggered.

Turning to FIG. 1, a flow diagram 100 depicts a prior art approach for performing a data retry. Following flow diagram 100, a data location on a storage medium from which data is to be retrieved is identified (block 110). The head and/or storage medium are moved relative to one another such that the head is located in proximity to the identified location and the data is retrieved from the storage medium (block 120). Analog processing is performed on the received data (block 130), and an analog to digital conversion is performed on the processed data (block 140). The retrieved digital data is then processed using a data decoding/detection technique to recover the original data (block 150).

It is determined whether the applied data decoding/detection technique converged on the data originally written to the storage medium (block 160). This determination may be done on a sector basis. Thus, when a failure to converge is identified it is considered a sector failure. Where a sector failure is not indicated (block 160), the data resulting from the decoding/detection process is provided as an output (block 170). Alternatively, where a sector failure is indicated (block 160), a data access retry is selected (block 180). When a retry is selected (block 180), one or more data receiving parameters may be modified (block 190) and the head and storage medium mechanically moved relative to each other to start the process of re-reading the data anew from the storage medium and processing the re-read data using the modified parameters. In some cases, it may take a large number of retries before the data is finally read accurately, with each retry requiring a mechanical repositioning of the head relative to the storage medium. As such, performing a large number of retries can require a substantial amount of time, which in many cases is unacceptable. A timeout period is often used to limit the number of retries. Where none of the many retires succeeds within the timeout period, the storage device may be failed.

Hence, for at least the aforementioned reasons, there exists a need in the art for advanced systems and methods for performing a data access retry.

BRIEF SUMMARY OF THE INVENTION

The present inventions are related to systems and methods for accessing data from a storage medium, and more particularly to systems and methods for retrying a previously failed data access from a storage medium.

Various embodiments of the present invention provide data processing circuits that include a multiplexer, a memory buffer, a data processing circuit, and a channel setting modification circuit. A first input of the multiplexer receives an input data set and a second input of the multiplexer receives a buffered data set. The multiplexer provides either the input data set or the buffered data set as a multiplexer output based upon a select signal. The memory buffer receives the multiplexer output and provides the buffered data set. Operation of the data processing circuit is at least in part governed by channel settings. The data processing circuit receives the multiplexer output and performs a data detection process. The select signal is asserted to select the buffered data set when the data detection process fails, and is asserted to select the input data set when the data detection process succeeds or when a fresh read of the input data is coming from the head. The channel setting modification circuit is operable to modify the channel settings when the data detection process fails.

In some embodiments of the present invention, the data processing circuit includes an equalizer circuit and a data detection circuit. The equalizer circuit receives the multiplexer data and provides an equalized data set, and the data detection circuit receives the equalized data set and performs a data detection process on the equalized data. In some such cases, the channel settings include a partial target response and an equalizer coefficient(s). Operation of the data detection circuit is at least in part governed by the partial response target, and operation of the equalizer circuit is at least in part governed by the equalizer coefficient(s). Modification of the channel setting set may include modifying either or both of the equalizer coefficient(s) and the partial response target.

In various instances of the aforementioned embodiments, the data written to the memory buffer is controlled by a write control circuit. In some such cases, the write control circuit provides for averaging the buffered data set with the input data set, and writing the result to the memory buffer as an updated buffered data set. In other such cases, the write control circuit provides for selectively writing a portion of the input data set into the memory buffer based upon information derived from the data processing circuit. In particular cases, the information derived from the digital processing is log-likelihood ratio information.

Other embodiments of the present invention provide methods for retrying a failed data access. Such methods include receiving a data set derived from a storage medium; storing the data set to a memory buffer; digitally processing the data set using a first set of channel settings; and based at least in part on a determination that the digital processing failed, accessing the data set from the memory buffer and digitally processing the data set using a second set of channel settings. In some such cases, digitally processing the data set includes performing an equalization process on the data set to provide an equalized data set, and performing a data detection process on the equalized data set.

In some instances of the aforementioned embodiments, receiving the data set includes reading information from the storage medium. In such instances, the methods may further include re-reading the data set from the storage medium, and updating the data set stored in the memory buffer. Updating the data set stored in the memory buffer may include replacing the data set with the data set re-read from the storage medium, replacing the data set with an average of the data set stored in the memory buffer and the data set re-read from the storage medium, or selectively replacing a portion of the data set with a corresponding portion of the data set re-read from the storage medium based upon information derived from the digital processing.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
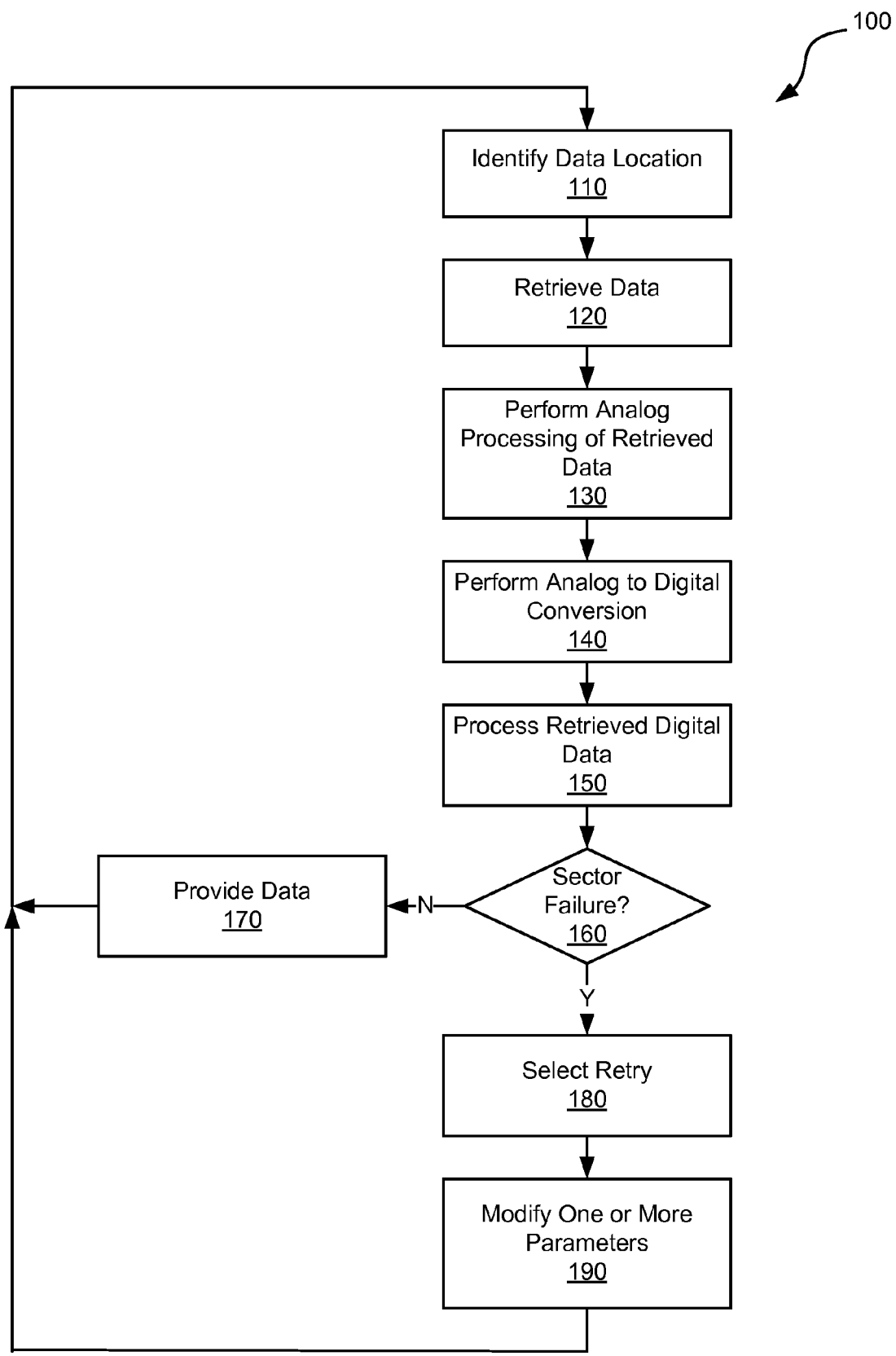
FIG. 1 a flow diagram depicts a prior art approach for performing a data retry.

The present inventions are related to systems and methods for accessing data from a storage medium, and more particularly to systems and methods for retrying a previously failed data access from a storage medium.

In general, a storage device includes two modes: an on-the-fly mode and a retry mode. The on-the-fly mode is the standard operational mode capable of providing recovered data at a predictable rate. The retry mode is utilized when a failure in the on-the-fly mode is detected. In the retry mode, one or more additional attempts are performed to recover the data from a given sector. While the on-the-fly mode operates to provide a sustained data rate, the retry mode operates to increase reliability where the on-the-fly mode fails.

The retry mode is most often triggered when a data access is attempted from a marginal sector. In some cases, a sector is rendered marginal where data is written off-track, fly-height (i.e., the distance between the head and the storage medium) is increased, there is a large phase disturbance during an initial access to the sector, the storage medium exhibits a defect in the area of the sector, or there is some thermal asperities such as an impact between the head and the storage medium that leads to a modification in the head operation. Based on the disclosure provided herein, one of ordinary skill in the art will recognize other reasons that a data read may be marginalized. In some cases, obtaining data from a marginal sector requires an adjustment in channel settings from the default channel settings that were obtained when the storage device was originally produced. As one example, when the storage device was originally produced, a particular set of equalized coefficients and partial response target may have been determined. For a marginal sector, a different set of equalized coefficients and partial response target may be required to recover data from the sector.

Various embodiments of the present invention provide retry circuitry and/or processes that are capable of performing a large number of retry iterations that each demand less time per iteration when compared with previous approaches. Such a reduction in retry time allows for increasing the number of retry iterations that may be performed within a given timeout period. This allows for attempting a retry across a larger number of channel settings, thus not only reducing the amount of time demanded by a given retry, but also increasing the probability of a successful retry within a set timeout period. For example, where the channel settings that are modified include a combination of partial response target and equalizer coefficients, a larger number of combinations may be tried within a given time period. Based upon the disclosure provided herein, one of ordinary skill in the art will recognize a variety of other advantages that may be achieved through utilization of systems, circuits and methods in accordance with different embodiments of the present invention.

Figure 2:
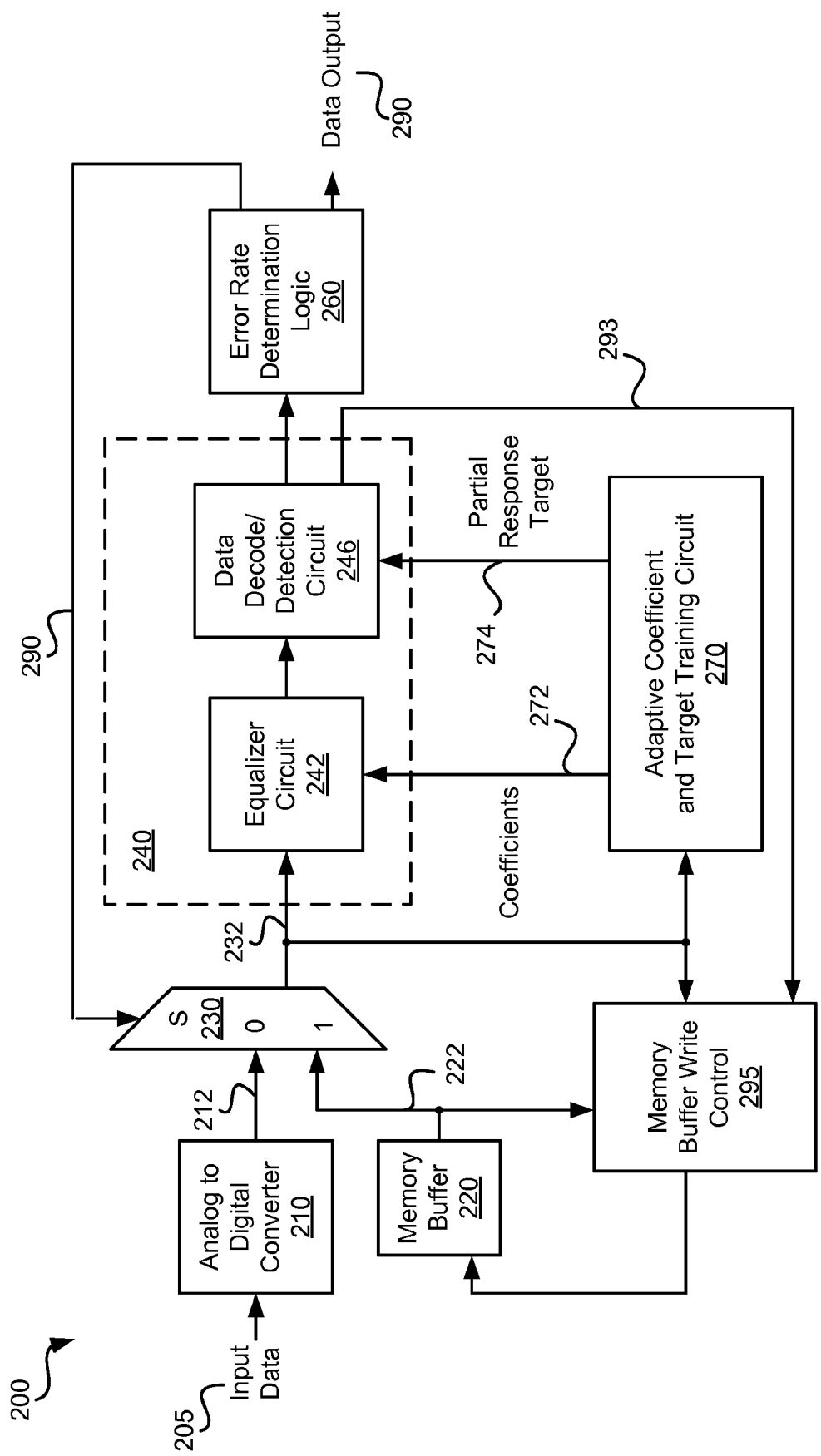
FIG. 2 depicts a data access system including retry circuitry in accordance with various embodiments of the present invention.

Turning to FIG. 2, a data access system 200 including retry circuitry is shown in accordance with various embodiments of the present invention. Data access system 200 receives an input data signal 205 at an analog to digital converter 210. Input data signal 205 is an analog signal representing data retrieved from a storage medium. In some cases, input data signal 205 is received from an analog conditioning circuit (not shown) that conditions an analog signal received from a read/write head assembly (not shown) that is disposed in relation to a storage medium (not shown). Based upon the disclosure provided herein, one of ordinary skill in the art will recognize a variety of other possible sources of input data 205. Analog to digital converter 210 converts input data 205 into a series of digital samples 212 that correspond to the magnitude of input data 205 at discrete time periods. Analog to digital converter 210 may be any type of analog to digital converter known in the art. Based upon the disclosure provided herein, one of ordinary skill in the art will recognize a variety of analog to digital converters that may be used in accordance with different embodiments of the present invention.

Digital samples 212 are provided to one data input of a multiplexer 230. Multiplexer 230 provides a series of digital samples 232 to a data processing circuit 240. In addition, digital samples 232 are provided to a memory buffer 220. Memory buffer 220 is of a size sufficient to hold a defined number of samples. In some cases, processing is done on a sector by sector basis. In such a case, the size of memory buffer 220 is large enough to store an entire sector of data. Based on the disclosure provided herein, one of ordinary skill in the art will recognize a variety of data set sizes that may be provided for data detection. An output 222 from memory buffer 220 is provided to another data input of multiplexer 230. Based upon the logic state of a select control signal 290, either digital samples 212 or output 222 are selected as digital samples 232.

As shown, digital data processing circuit 240 includes an equalizer circuit 242 and a data detection/decoding circuit 246. The operation of equalizer circuit 242 is at least in part governed by coefficients 272, and the operation of data decode/detection circuit 246 is at least in part governed by a partial response target 274. Default values for coefficients 272 and partial response target 274 may be established during manufacture. These default values may be modified by an adaptive coefficient and target training circuit 270 based on the received data. In some cases, equalizer circuit 242 is implemented as a finite impulse response filter as is known in the art. Based upon the disclosure provided herein, one of ordinary skill in the art will recognize a variety of equalizer circuits that may be used in accordance with different embodiments of the present invention. Data decode/detection circuit 246 may be implemented to include a low density parity check decoder as are known in the art. Based upon the disclosure provided herein, one of ordinary skill in the art will recognize a variety of data decode/detection circuits that may be used in accordance with different embodiments of the present invention. It should be noted that any digital data processing circuit may be used in accordance with different embodiments of the present invention, and that a relatively simple digital data processing circuit is selected here for illustration purposes only.

Adaptive coefficient and target training circuit 270 may be any circuit known in the art that is capable of modifying coefficients 272 and partial response target 274. In some cases, the modified coefficients 272 and partial response target 274 are selected adaptively to reduce the number of iterations required to converge on a desired combination. In other cases, the modified coefficients 272 and partial response target 274 are selected based on a matrix of pre-selected combinations of coefficients 272 and partial response target 274.

An error rate determination logic circuit 260 receives the recovered data from digital data processing circuit 240 and determines an error rate associated with the data. As used herein, the phrase "error rate" is used in its broadest sense to define whether the data detection process (LDPC decoder or other error correction code) indicates that the original data is recoverable or not. Thus, for example, an error rate that is too high indicates that the original data is not recoverable. In contrast, an error rate that is sufficiently low indicates that the original data is recoverable. Based upon the disclosure provided herein, one of ordinary skill in the art will recognize a variety of "error rates", or indications of recoverable data, that may be used in relation to different embodiments of the present invention. Where the error rate is too high, select control signal 290 is asserted such that output 222 is selected for re-processing. Alternatively, where the error rate is sufficiently low, select control signal 290 is asserted such that digital samples 212 are selected for processing. Also, where the error rate is sufficiently low, a data output (i.e., the result of data decode/detection circuit 246) is provided as a data output 280. The following pseudo-code represents the operation of error rate determination logic circuit 260:

```
If (Data Decode/Detection Fails to Converge)
{
    Assert Select Control Signal 290 as a Logic '1'; and
    Disable Data Output 280.
}
Else If (Data Decode/Detection Fails to Converge)
{
    Assert Select Control Signal 290 as a Logic '0'; and
    Enable Data Output 280.
}
```

In operation, select control signal 290 is asserted to select digital samples 212 via multiplexer 230. Data retrieved from a storage medium is provided as input data signal 205 where it is converted to digital samples 212 by analog to digital converter 210. Digital samples 212 are provided to digital data processing circuit 240 via multiplexer 230 for processing. In addition, data samples 212 are provided to memory buffer 220 where a defined series are stored. Ultimately, the processed digital samples 212 are provided to error rate determination logic circuit 260. Again, error rate determination circuit 260 operates to determine an "error rate", or indication of whether the original data was recoverable or not. Where the error rate is too high, select control signal 290 is asserted to select output 222 via multiplexer 230 for the subsequent iteration. At the same time, adaptive coefficient and target training circuit 270 adjusts both coefficients 272 and partial response target 274 for the next iteration. At this juncture, data is transferred from memory buffer 220 to digital data processing circuit 240 for re-processing using the updated coefficients 272 and partial response target 270. Output 222 is provided to digital data processing circuit 240 via multiplexer 230 for re-processing. Ultimately, the processed output 222 are provided to error rate determination logic circuit 260. Where the error rate is too high, select control signal 290 remains asserted to select output 222 via multiplexer 230 for the subsequent iteration using newly updated coefficients 272 and partial response target 270. Alternatively, where the error rate is sufficiently low, select control signal 290 is asserted to select digital samples 212 via multiplexer 230 and the process starts again for the newly read data.

By buffering the received data in memory buffer 220 and then re-processing from the buffer when a retry condition occurs, many retries can be accomplished in the time that it would take to reposition the read/write head assembly relative to the storage medium to re-read the data for retry processing. This allows for a relatively fast retry process saving processing time related to accessing the storage medium. In addition, this allows for trying a relatively large number of different combinations of channel settings within a given timeout period, thus increasing the probability of a successful retry. Based upon the disclosure provided herein, one of ordinary skill in the art will recognize other advantages that may be achieved through use of different embodiments of the present invention.

In some cases, a memory buffer write control circuit 295 is used to control data written to memory buffer 220 on subsequent reads of the same data set from the storage medium. In some cases, when the data set is initially read, it is used to overwrite the contents of memory buffer 220 (i.e., digital samples 232 are written to memory buffer 220). On subsequent reads of the same data set, one of a variety of approaches may be employed for the data written to memory buffer 220. In one case, digital samples 232 may be used again to overwrite the contents of memory buffer 220. In such a case, memory buffer write control circuit 295 merely passes digital samples 232 to memory buffer 220. In other cases, the newly read data may be averaged with data already in the storage buffer. In this case, memory buffer write control circuit 295 averages output 232 with digital samples 232, and provides the result to memory buffer 220. Such an approach may be useful where, for example, uncorrelated noise is evident that may be resolved through an averaging process. As yet another alternative, the newly re-read data may be selectively written to the buffer based upon likelihood information (e.g., Log-Likelihood Ratio (LLR) data) available from the data decode/detection circuit. In such cases, memory buffer write control circuit 295 receives LLR data 293 from data decode/detection circuit 246 and uses the data to guide a selective overwrite of data. For example, where LLR data 293 indicates that a particular bit of output 222 is good, it is not overwritten. In contrast, where LLR data 293 indicates that a particular bit of output 222 is bad, it is overwritten by a corresponding bit in digital samples 232. Such an approach may be useful where, for example, dust on the head is resulting in a spurious misread of the information on the storage medium. Based upon the disclosure provided herein, one of ordinary skill in the art will recognize a variety of approaches for buffering data in buffer 220 on subsequent reads.

Figure 3:
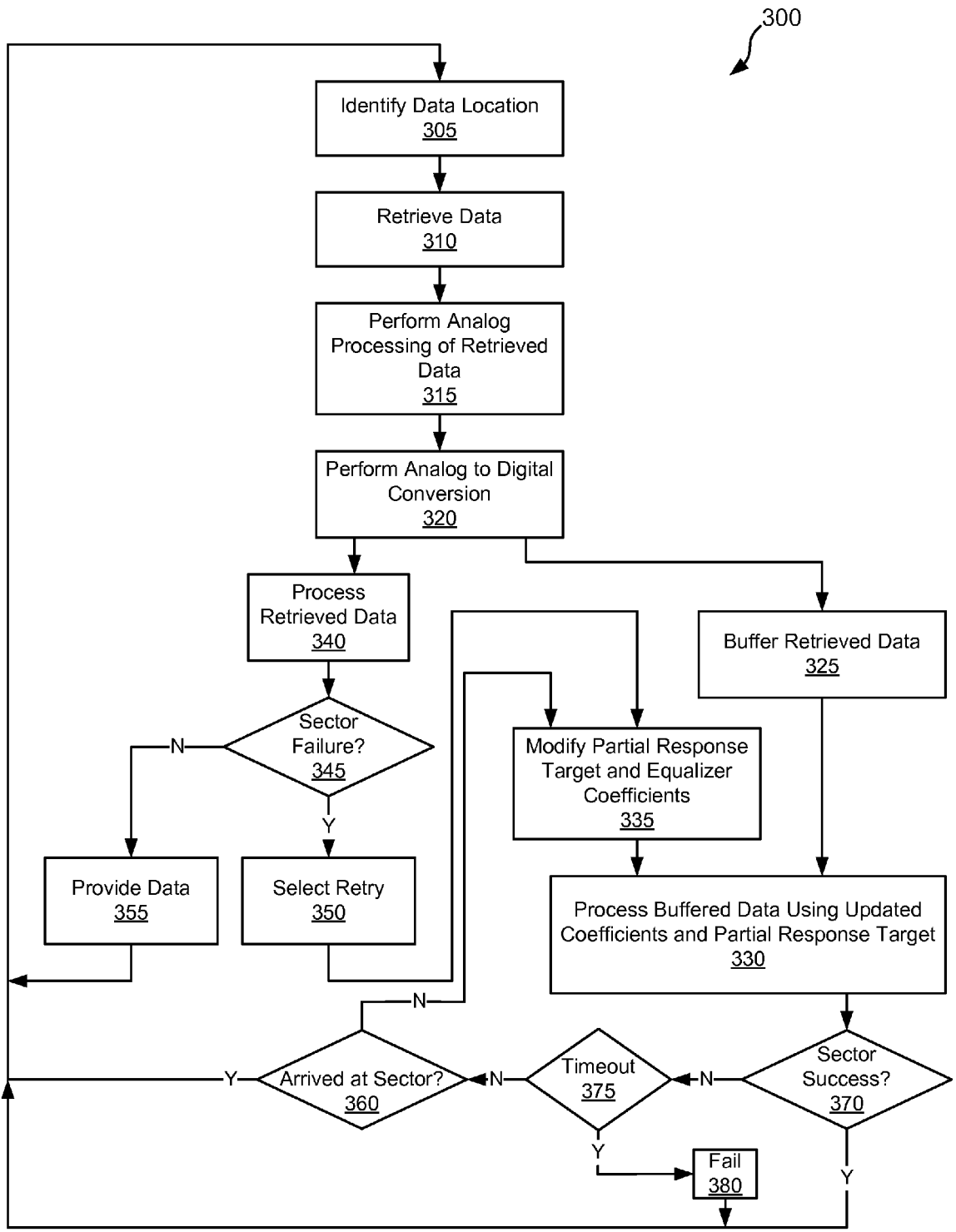
FIG. 3 is a flow diagram depicting a method for retrying a failed data access in accordance with some embodiments of the present invention.

Turning now to FIG. 3, a flow diagram 300 depicts a method for retrying a failed data access in accordance with some embodiments of the present invention. Following flow diagram 300, a data location on a storage medium from which data is to be retrieved is identified (block 305). This may include, for example, receiving a search address from a disk drive controller. In some cases, the data to be retrieved is spread across several sectors and/or tracks on the storage medium. A read/write head and storage medium are moved relative to one another such that the head is located in proximity to the identified location and the data is retrieved from the storage medium (block 310). Analog processing is performed on the received data (block 315). In some embodiments of the present invention, the analog processing includes application of a variable gain adjustment and filtering using a continuous time filter. Based upon the disclosure provided herein, one of ordinary skill in the art will recognize a variety of analog processing techniques and/or analog processing circuitry that may be used in relation to different embodiments of the present invention. An analog to digital conversion is performed on the processed data (block 320). The analog to digital conversion may be done using any analog to digital converter known in the art. The retrieved digital data is introduced to a digital data processing circuit where it is processed (block 340) and to a buffer where it is stored for use in a potential retry process (block 325).

Processing of the retried data may include, for example, performing a decoding processing and/or a data detection process as are known in the art. It is determined whether the digital data processing successfully reproduced the data originally written to the storage medium (block 345). In some cases, the data on the storage medium is encoded on a sector by sector basis, and thus determination of whether the result converged is made on a sector by sector basis. Where the data does not converge, it is considered a sector failure. Where a sector failure is not indicated (block 355), the data derived from the digital data processing (block 340) is provided as an output and the process is started again for the next sector of data.

Alternatively, where a sector failure is indicated (block 345), a retry process is selected (block 350). With the retry process selected (block 350), the previous channel settings are modified (block 335). In one embodiment of the present invention, this includes modifying either or both of a partial response target and equalizer coefficients. Based upon the disclosure provided herein, one of ordinary skill in the art will recognize a variety of channel settings that may be modified. The digital data processing is performed on the previously buffered data using the modified channel settings (block 330). Of note, this digital data processing does not need to wait for the read/write head assembly to be mechanically moved to re-read the failed data. This saves considerable time when the retry process is called for, and increases the probability of recovering the data where a limited time for recovery is allotted.

Once the retry processing is complete, it is determined whether the digital data processing successfully reproduced the data originally written to the storage medium (block 370). Again, in some cases, the data on the storage medium is encoded on a sector by sector basis, and thus determination of whether the result converged is made on a sector by sector basis. In such cases where the data does not converge, it is considered a sector failure. Where a sector success is indicated (block 370), the data derived from the digital data processing (block 330) is provided as an output and the process is started again for the next sector of data.

Alternatively, where a sector success is not indicated (block 370), it is determined whether a timeout condition has been met (block 375). Such a timeout condition may be, for example, a time period during which retry processes must complete before an error message is sent. In some embodiments of the present invention, the time period is governed by a timer circuit that is started when the retry condition is first indicated and counts up until either the error condition goes away or until a predefined time period is exceeded. Where a timeout condition is indicated (block 375), a data failure flag is set (block 380) and the retry process is started again for the next sector of data.

Alternatively, where a timeout condition is not indicated (block 375), it is determined whether the same sector from which the data in the buffer was originally derived is ready to be read (i.e., is physically located near the read/write head assembly)(block 360). If the data is ready to be read again via the read/write head assembly (block 360), the process of reading and processing the data is restarted for the same data (blocks 305-350). Where the retry process has not yet resolved, the data being re-read from the storage medium may overwrite the data previously maintained in the buffer. Alternatively, the newly read data may be averaged with data already in the storage buffer. In this case, an averaging circuit would be included along with buffer 220. Such an approach may be useful where, for example, uncorrelated noise is evident that may be resolved through an averaging process. As yet another alternative, the newly re-read data may be selectively written to the buffer based upon likelihood information (e.g., Log-Likelihood Ratio (LLR) data) available from the data decode/detection circuit. Such an approach may be useful where, for example, dust on the head is resulting in a spurious misread of the information on the storage medium. Based upon the disclosure provided herein, one of ordinary skill in the art will recognize a variety of approaches for buffering data in buffer 220 on subsequent reads.

Alternatively, where the data is not ready to be read again via the read/write head assembly (block 360), the previous channel settings are modified (block 335) again and the data from the buffer is digitally processed again using the new channel settings (blocks 330). The process of modifying channel settings (block 335) and re-processing the buffered data using the new channel settings (block 330) is repeated until either the data processing converges (block 330) or a timeout condition is met (block 375).

Figure 4:
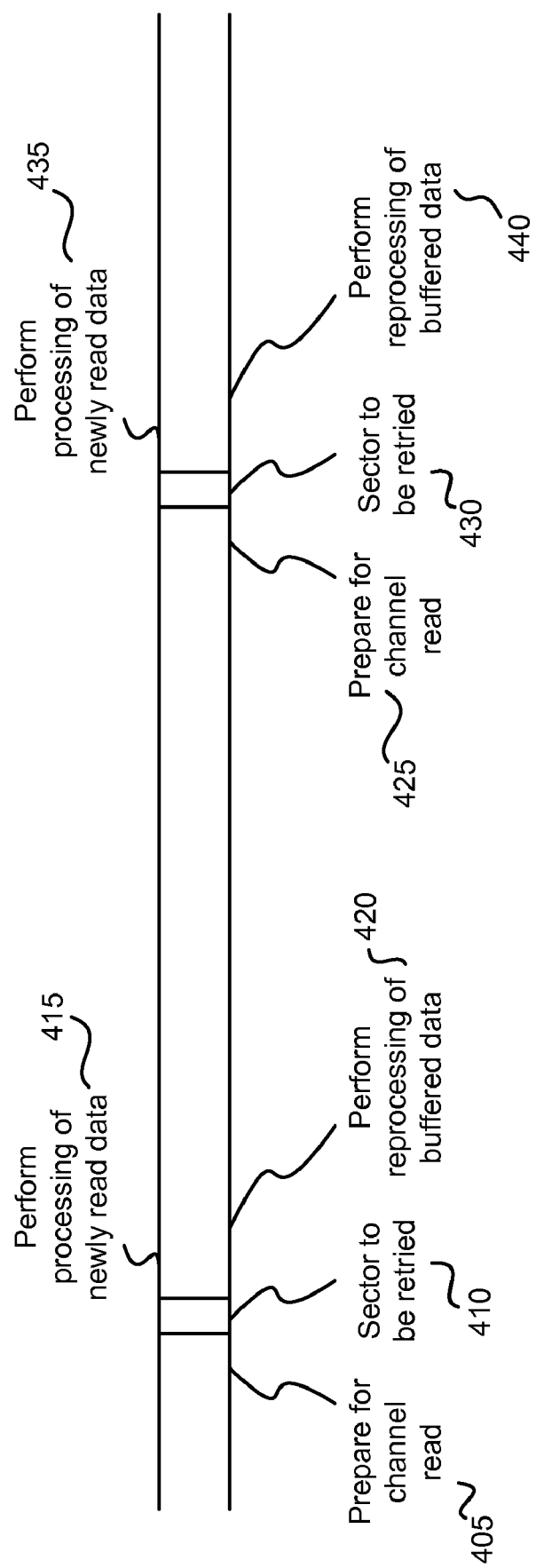
FIG. 4 graphically depicts an exemplary retry process timing in accordance with one or more embodiments of the present invention.

Turning to FIG. 4, a graphical timeline 400 depicts an exemplary retry process timing in accordance with one or more embodiments of the present invention. As shown, the channel is initially prepared to read data from the storage medium 405. The subsequent data read includes reading data from a sector 410 that will ultimately need to be retried. The data from the problematic sector is originally processed 415 resulting in a retry request. At the same time the data is received, it is buffered. Once the retry request is received, data processing is repeated one or more times using different channel settings using the original data pulled from the buffer 420. A number of retry attempts may be performed until the read/write head assembly approaches the defective sector anew when preparations for re-reading the defective sector begin 425. Once the channel is prepared, data from the defective sector is re-read 430 and the newly read data is processed using updated channel settings 435. At the same time the data is received, it is buffered. Where this processing continues to result in an unacceptable error rate, the retry process continues using continually modified channel settings and data pulled from the buffer 440. This process continues until either a timeout condition is achieved at which time a data failure is indicated, or until the digital data processing correctly resolves the data.

Figure 5:
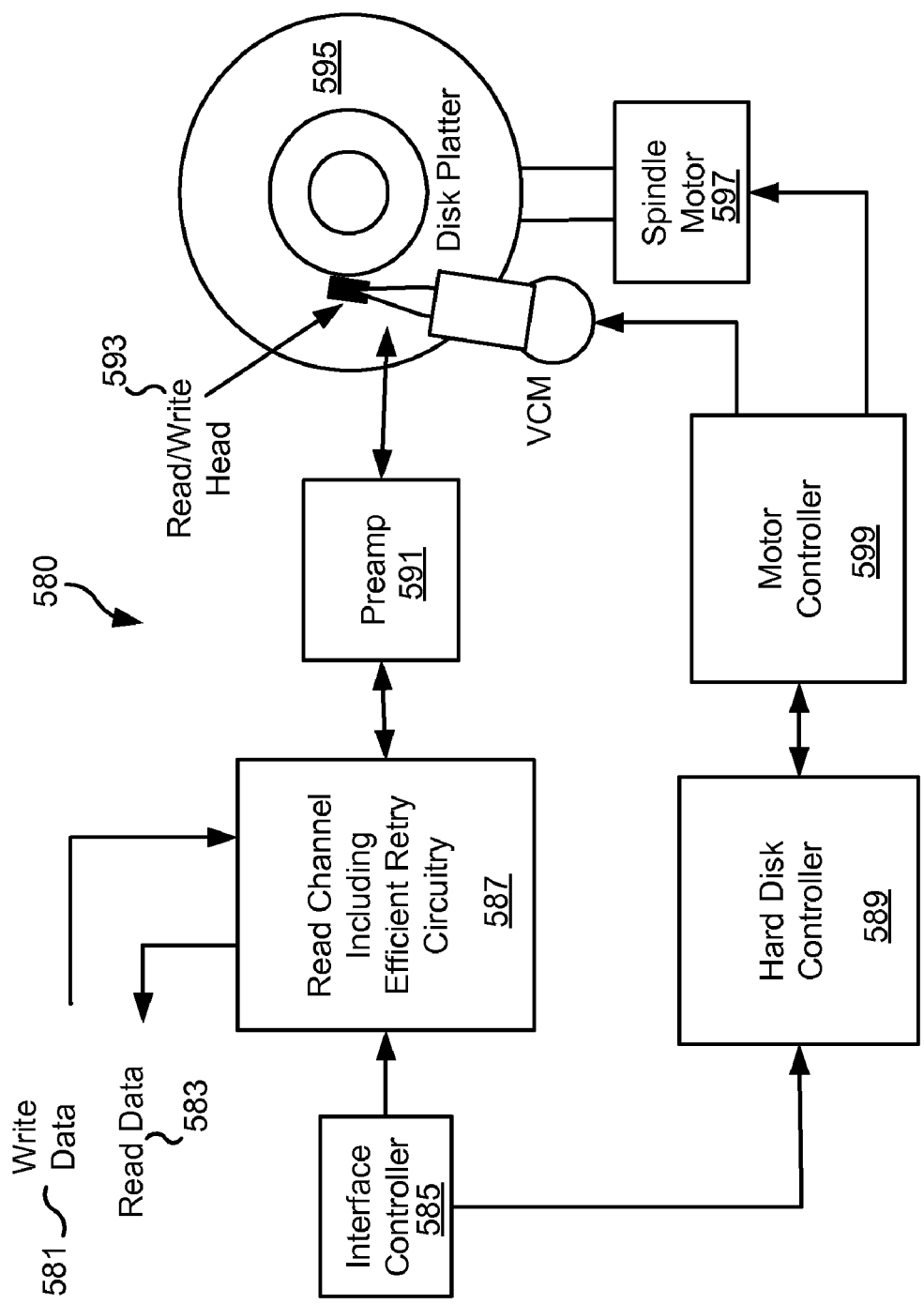
FIG. 5 shows a storage system including efficient retry circuitry in accordance with some embodiments of the present invention.

FIG. 5 shows a storage system 580 including a read channel 587 with efficient retry circuitry in accordance with some embodiments of the present invention. Storage system 580 may be, for example, a hard disk drive. The incorporated efficient retry circuitry is capable of performing one or more retries during the time that it takes to newly reposition a read/write head assembly 593 in proximity to a failed sector on a disk platter 595. The efficient retry circuitry may include components similar to those described above in relation to FIG. 2 above, and may operate similar to that described in relation to FIGS. 3-4 above. In addition, storage system 580 includes an interface controller 585, a hard disk controller 589, a motor controller 599, and a spindle motor 597. Interface controller 585 controls addressing and timing of data to/from disk platter 595. The data on disk platter 595 consists of groups of magnetic signals that may be detected by read/write head assembly 593 when the assembly is properly positioned over disk platter 595. The data signals are typically arranged in sectors and tracks as is known in the art. In a typical read operation, read/write head assembly 593 is accurately positioned by motor controller 599 over a desired data track on disk platter 595. Motor controller 599 both positions read/write head assembly 593 in relation to disk platter 595 and drives spindle motor 597 by moving read/write head assembly to the proper data track on disk platter 595 under the direction of hard disk controller 589. Spindle motor 597 spins disk platter 595 at a determined spin rate (RPMs).

Once read/write head assembly 593 is positioned adjacent the proper data track, magnetic signals representing data on disk platter 595 are sensed by read/write head assembly 593 as disk platter 595 is rotated by spindle motor 597. The sensed magnetic signals are provided as a continuous, minute analog signal representative of the magnetic data on disk platter 595. This minute analog signal is transferred from read/write head assembly 593 to read channel module 587. Read channel module 587 performs a data detection process that sometimes fails. When a failure occurs, the retry circuitry attempts to derive the originally written data by reprocessing the data read from disk platter 595 that was buffered during the initial read attempt. This retry process may be repeated until disk platter completes a revolution bringing the problematic region within proximity of read/write head assembly 593. Where the retry process has not yet concluded, the data is read anew and the retry process continues on the newly read data. Where the data is finally resolved, it is provided as read data 583 to a receiving circuit. Where the data does not resolve, an error is reported to interface controller 585. A write operation is substantially the opposite of the preceding read operation with write data 581 being provided to read channel module 587. This data is then encoded and written to disk platter 595.

In conclusion, the invention provides novel systems, devices, methods and arrangements for performing a data access retry. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, the circuit comprising:
a multiplexer, wherein a first input of the multiplexer is operable to receive an input data set and a second input of the multiplexer is operable to receive a buffered data set, and wherein the multiplexer is operable to provide either the input data set or the buffered data set as a multiplexer output based upon a select signal;
a memory buffer coupled to an output of the multiplexer, and operable to receive the multiplexer output and to provide the buffered data set;
a data processing circuit, wherein operation of the data processing circuit is at least in part governed by channel settings, wherein the data processing circuit is operable to receive the multiplexer output and to perform a data detection process, wherein the select signal is assertable to select the buffered data set when the data detection process fails, and wherein the select signal is assertable to select the input data set when the data detection process succeeds; and
a channel setting modification circuit operable to modify the channel settings when the data detection process fails.

2. The circuit of claim 1, wherein the data processing circuit includes:
an equalizer circuit that receives the multiplexer data and provides an equalized data set; and
a data detection circuit, wherein the data detection circuit receives the equalized data set and performs the data detection process on the equalized data.

3. The circuit of claim 2, wherein the channel settings include a partial target response and an equalizer coefficient, wherein operation of the data detection circuit is at least in part governed by the partial response target, and wherein operation of the equalizer circuit is at least in part governed by the equalizer coefficient.

4. The circuit of claim 3, wherein the channel setting modification circuit is operable to modify a channel setting set selected from a group consisting of: the partial response target, the equalizer coefficient, and both the equalizer coefficient and the partial response target.

5. The circuit of claim 1, wherein data written to the memory buffer is controlled by a write control circuit, and wherein the write control circuit provides for averaging the buffered data set with the input data set, and writing the result to the memory buffer as an updated buffered data set.

6. The circuit of claim 1, wherein data written to the memory buffer is controlled by a write control circuit, and wherein the write control circuit provides for selectively writing a portion of the input data set into the memory buffer based upon information derived from the data processing circuit.

7. The circuit of claim 6, wherein the information derived from the data processing circuit is log-likelihood ratio information.

8. A method for retrying a failed data access, the method comprising:
receiving a data set derived from a storage medium;
storing the data set to a memory buffer;
digitally processing the data set using a first set of channel settings;
based at least in part on a determination that the digital processing failed, accessing the data set from the memory buffer and digitally processing the data set using a second set of channel settings;
re-reading the data set from the storage medium; and
updating the data set stored in the memory buffer by replacing the data set with the data set re-read from the storage medium.

9. The method of claim 8, wherein digitally processing the data set includes:

performing an equalization process on the data set to provide an equalized data set; and performing a data detection process on the equalized data set.

10. The method of claim 9, wherein the first set of channel settings includes a partial response target at least in part governing operation of the data detection process and an equalizer coefficient at least in part governing operation of the equalization process.

11. The method of claim 10, wherein the partial response target is a first partial response target, wherein the equalizer coefficient is a first equalizer coefficient, wherein the second set of channel settings includes a second partial response target and a second equalizer coefficient, and wherein the first equalizer coefficient is different from the second equalizer coefficient.

12. The method of claim 11, wherein the first partial response target is different from the second partial response target.

13. The method of claim 8, wherein receiving the data set includes reading information from the storage medium.

14. The method of claim 8, wherein updating the data set stored in the memory buffer includes selectively replacing a portion of the data set with a corresponding portion of the data set re-read from the storage medium based upon information derived from the digital processing.

15. The method of claim 14, wherein the information derived from the digital processing is log-likelihood ratio information.

16. A storage system, the system comprising:
a head disposed in relation to a storage medium;
an analog to digital converter, wherein the analog to digital converter converts an analog signal derived from the head into a corresponding input data set;
a read channel circuit, wherein the read channel circuit receives the input data set, and wherein the read channel circuit includes:
a multiplexer, wherein a first input of the multiplexer is the input data set and a second input of the multiplexer is a buffered data set, and wherein the multiplexer provides either the input data set or the buffered data set as a multiplexer output based upon a select signal;
a memory buffer, wherein the memory buffer receives the multiplexer output and provides the buffered data set;
a data processing circuit, wherein operation of the data processing circuit is at least in part governed by channel settings, wherein the data processing circuit receives the multiplexer output and performs a data detection process, wherein the select signal is asserted to select the buffered data set when the data detection process fails, and
wherein the select signal is asserted to select the input data set when the data detection process succeeds; and
a channel setting modification circuit, wherein the channel setting modification circuit is operable to modify the channel settings when the data detection process fails.

17. The system of claim 16, wherein the data processing circuit includes:
an equalizer circuit that receives the multiplexer data and provides an equalized data set;
a data detection circuit, wherein the data detection circuit receives the equalized data set and performs a data detection process on the equalized data; and
wherein the channel settings include a partial target response and an equalizer coefficient, wherein operation of the data detection circuit is at least in part governed by the partial response target, and wherein operation of the equalizer circuit is at least in part governed by the equalizer coefficient.

18. A data processing circuit, the circuit comprising:
a selector circuit operable to select between an input data set and a buffered data set based on a selector control, and to provide a selector output;
a storage circuit operable to store the input data set and to provide the buffered data set;
a data processing circuit, wherein operation of the data processing circuit is at least in part governed by channel settings, wherein the data processing circuit is operable to receive the selector output and to perform a data detection process, and wherein the data processing circuit is operable to assert the selector control to select the buffered data set when the data detection process fails, and to select the input data set when the data detection process succeeds;
a channel setting modification circuit operable to modify the channel settings when the data detection process fails; and
a write control circuit operable to control data storage to the storage circuit, wherein the write control circuit provides for selectively writing a portion of the input data set into the storage based upon information derived from the data processing circuit.

19. The circuit of claim 18, wherein the information derived from the data processing circuit is log-likelihood ratio information.

20. The circuit of claim 18, wherein the data processing circuit includes:
an equalizer circuit operable to receive the selector output and to provide an equalized data set;
a data detection circuit operable to receive the equalized data set and to perform the data detection process on the equalized data; and
wherein the channel settings include a partial target response and an equalizer coefficient, wherein operation of the data detection circuit is at least in part governed by the partial response target, and wherein operation of the equalizer circuit is at least in part governed by the equalizer coefficient.

21. A method for retrying a failed data access, the method comprising:
receiving a data set derived from a storage medium;
storing the data set to a memory buffer;
digitally processing the data set using a first set of channel settings;
based at least in part on a determination that the digital processing failed, accessing the data set from the memory buffer and digitally processing the data set using a second set of channel settings;
re-reading the data set from the storage medium;
updating the data set stored in the memory buffer by selectively replacing a portion of the data set with a corresponding portion of the data set re-read from the storage medium based upon information derived from the digital processing.

22. The method of claim 21, wherein digitally processing the data set includes:
performing an equalization process on the data set to provide an equalized data set; and
performing a data detection process on the equalized data set.

23. The method of claim 22, wherein the first set of channel settings includes a partial response target at least in part governing operation of the data detection process and an equalizer coefficient at least in part governing operation of the equalization process.

24. The method of claim 23, wherein the partial response target is a first partial response target, wherein the equalizer coefficient is a first equalizer coefficient, wherein the second set of channel settings includes a second partial response target and a second equalizer coefficient, and wherein the first equalizer coefficient is different from the second equalizer coefficient.

25. The method of claim 21, wherein updating the data set stored in the memory buffer includes replacing the data set with the data set re-read from the storage medium.

26. The method of claim 21, wherein the information derived from the digital processing is log-likelihood ratio information.

* * * * *